April 12, 1955  K. REINER  2,705,991
GANG NUT RETAINER
Filed April 10, 1952

INVENTOR,
KENNETH REINER
BY Francis D. Ammen
ATTORNEY

… … …

2,705,991

GANG NUT RETAINER

Kenneth Reiner, Los Angeles, Calif.

Application April 10, 1952, Serial No. 281,491

3 Claims. (Cl. 151—41.71)

This invention relates to a construction element or detail that is used quite extensively in airplane fabrication; for example, when connecting parts where a series or "gang" of bolts are to be mounted, spaced apart along a line. This element is of channel form and is commonly called a gang-nut retainer, functions usually as an elongated holder or retainer for a series of nuts, the threads of which receive the threaded ends of a corresponding series of bolts.

In practice the channel shaped retainer is deformed at spaced intervals so as to hold the nuts at any predetermined distance apart, depending upon the special requirements of design in the locality where the series of bolts are to be mounted in the structure.

Such gang nut retainers hold the nuts so that they have considerable freedom of movement in any lateral direction to enable each nut to operate as a "self-centering" nut, to align itself accurately with the bolt that is to be secured to the nut.

Each nut usually includes a hexagonal body, or a substantially cylindrical internally threaded sleeve with an integral base plate of rectangular form that enables the nut to be retained in the channel approximately in its aligning position and against rotation when its bolt is being screwed into the thread of the nut.

The base-plates of the nuts are retained in the channel usually by a plain flange at each side bent inward at its upper edge so as to present a flat extension substantially parallel with the plane of the web of the channel.

In practice the retainer channel assembly is usually secured to a plate or other part that supports it by fasteners such as rivets located on the retainer between the location of the nuts carried by the retainer.

The retainer holds the nuts substantially in register with openings in the support, for example, the plate to which the retainer is attached. The bolts or other threaded members that are secured in place pass through the openings in the supporting plate and into and through openings in the web or body portion of the retainer. The openings in the plate and the retainer register substantially with each other.

The bolts or other threaded members, of course, are threaded so that they can be screwed into the bodies of the nuts, respectively and usually pass into the nuts after passing through the said registering openings.

In practice also, the entering tips of the bolts being used in the connection are shoved against the retained nuts with considerable force while being rotated to mesh their threads into the threads of the nuts. This subjects the flanges of the channels that retain the nuts to considerable strain. This strain is recognized, and is very important as the retainers must resist this strain; and the strength required to be resisted by the flanges of the channel is referred to in specifications as the "push-out" strength for such retainer assemblies.

One of the objects of this invention is to provide a construction for the retaining flanges of such channels that will increase the "push-out" strength of the channel as compared with a simple flange projecting inwardly from the sides of the channel and parallel with the web of the channel.

A principal object of the present invention is to provide a flange on the nut-retainer channels that will present a firm and rigid holding point or line for the base-plates or side flanges of the retained nuts.

Further objects of the invention will be readily apparent from a careful reading of the present specification and a study of the accompanying drawing.

The invention consists in the channel form to be presently described, the novel features of which co-operate to produce an efficient channel form gang nut retainer.

A preferred embodiment of the invention is described in the following specification, while the broad scope of the invention is pointed out in the appended claims.

Figure 1:
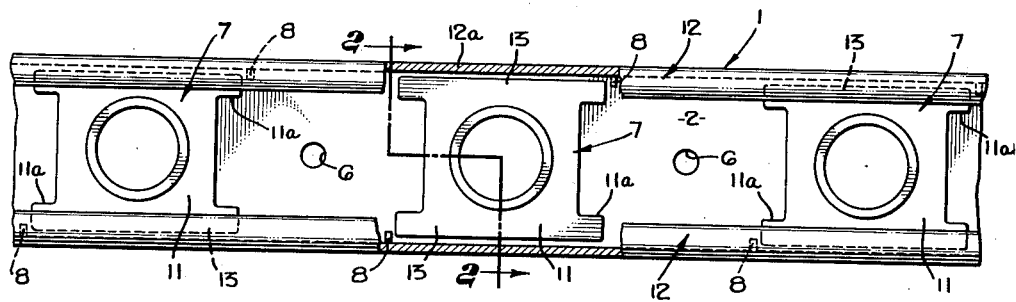
Figure 1 is a plan of a gang-nut retainer embodying this invention illustrating three spaced nuts of the type referred to, and in this view a portion of each retaining flange is broken away and shown in partial section.

Referring more particularly to the parts, 1 indicates the retainer member of my invention which in the present instance is an elongated plate-form channel including a web 2.

This channel 1 is usually provided with spaced openings such as the opening 3 that register with corresponding spaced openings such as the opening 4 in a structural part or plate 5.

To facilitate attaching the channel to the structural plate the web 2 of the channel 1 is usually provided with spaced openings 6 for fasteners such as rivets.

The present drawing illustrates a series or gang of nuts 7 that are maintained spaced apart by stop means of small lugs 8 that are integral with the web, and punched up from the web 2 at proper distances apart to permit a slight shifting movement of the nuts in a longitudinal direction along the channel.

In the present drawing each nut 7 includes a body or sleeve that may be of "hex" form but which, in the present case, is in the form of a cylindrical sleeve with right or left internal threads 10. Such nuts 7 are usually provided with an integral base plate 11 or peripheral flange that seats on the inner face of the web 2.

Figure 2:
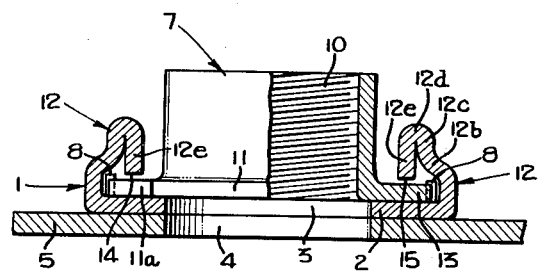
Figure 2 is a cross-section through the channel in a vertical plane taken on the broken line 2—2, so as to show the middle nut half in section and half in elevation, and illustrating the preferred cross-section of the retainer flanges in practicing my invention.

The base-plates 11 are usually of rectangular or square form. The channel 1 includes side flanges 12 located respectively at the extreme side edges of the web as indicated in Figure 2 that co-operate with the adjacent lateral portions 13 of the base plates 11 to retain the nuts 7 in the channels.

In accordance with my invention I give the side flanges 12 a form that renders them rigid and increases their "push-out" strength, that is to say, their resistance to upward pressure against them by the flanges 13; at the same time avoiding the use of a re-entrant right angle located in such a way that it will be immediately subjected to the bending moment developed in an ordinary right angle flange projecting inwardly at the edge of a channel.

In order to accomplish this I form each flange 12 with a root-extension 12a that projects substantially at right angles to the plane of the web 2, and the outer or upper portion of each root extension 12a is bent back and down so as to present an extension flange the lower edge of which lies close to the upper faces of the flanges 13 of the base plates of the nuts. In the present instance this extension flange includes an inward off-set extension 12b that is offset in toward the longitudinal axis of the channel so that its upper portion (see Figure 2) overlies the flange portions 13 of the base-plate.

The uppermost off-set portion 12c is formed with a sharp return bend or folded edge 12d beyond which a terminal extension or flange 12e is formed that projects back and down toward the flange portion 13 and terminates short of the same so that a gap is formed between its terminal edge 14 and the adjacent face of the flange portion 13. But this gap is sufficient to insure ample clearance at 15, to permit requisite freedom of movement of the nuts when being run into the channels from their ends; also to permit any slight tilting of the axis the sleeve of a nut if it has a threaded bolt end passing into the nut to find its way into the threads of the nut.

In explanation of the advantageous effects of employing the offset extension 12b, it can be seen from a consideration of the forces developed in this type of flange by a force acting upwardly against the lower edge of the flange 12e as shown in Figure 2, that such an upwardly acting force, of course develops a tensile force in the offset extension applied at its upper end where it connects integrally to the upper portion of the flange 12e. This force tends to pull the curved extension 12b up; in other words—tends to straighten it. The inclined, or arcuate form of its inner and outer faces resist this pull by flattening slightly, and in doing so absorb the force resiliently and at the same time imparting an upward pull to the root of the flange 12 at its junction to the web 2 of the channel. The bending stress, if there is any left, is taken at the relatively obtuse angle between the lower end of the inner curved face of the offset extension where it merges into the inner vertical face of the flange adjacent the web 2. In this way, the resistance offered to an upward force acting on the flange at the gap 15 is "cushioned" and dissipated before it arrives at the location of the root of the flange 12.

The lateral flange portions 13 of the base plates 11 of the nuts preferably are formed with short tongues 11a projecting longitudinally along the inside faces of the root-extensions 12a. These tongues enable the over-all length of the base-plates 11 to be varied by cutting off the tongues to any desired length.

Other embodiments of this invention may be resorted to without departing from the spirit of this invention.

I claim as my invention and desire to secure by Letters Patent:

1. A channel-form retainer for a nut that has oppositely disposed outwardly projecting base flanges, said retainer having an elongated plate-form body, said plate-form body having a lateral flange at each of its longitudinal extreme edges, each of said flanges having a body portion, an off-set portion and an extension portion located in a plane disposed away from the plane of said body portions and inwardly toward the longitudinal central axis of the body of said retainer, an amount substantially the thickness of said flange, said off-set extension portions being substantially parallel to said body portions and having an outer folded edge portion in the form of a downwardly extending flange-extension disposed inwardly and out of the plane of said first named flanges respectively, and toward the longitudinal axis of the retainer and terminating short of the plane of said plate-form body so as to form a gap therebetween for receiving the flange of the nut.

2. In a retainer and nut assembly for securing a series of spaced threaded members to a supporting plate or the like having a series of spaced openings, the combination of a channel form retainer having an elongated plate-form web with a series of spaced openings through the same, said web having integral upwardly extending flanges at the extreme edges thereof, a series of nuts having threaded sleeves with integral base plates, the longitudinal side edges of said base plates spaced so as to lie adjacent to said flanges and so as to permit limited lateral movement of the base plates and the nuts, said web having stop means struck up therefrom adjacent to the transverse edges of said base plates so as to permit limited movement of said base plates and the sleeves longitudinally on said web, the outer edge portions of said flanges being offset inwardly towards each other an amount substantially equal to the thickness of said flanges and having integral extensions along the inner faces thereof projecting back toward the said web, overlying the said base plates and limiting the movement of said base plates and their sleeves away from the plane of the said web, and cooperating with said flanges and said integral stop means on the web to retain the nuts in a floating condition in said retainer.

3. A retainer and nut assembly according to claim 2 in which the said offset is in the form of an ogee curve.

References Cited in the file of this patent

UNITED STATES PATENTS

| | | |
|---|---|---|
| 2,144,350 | Swanstrom | Jan. 17, 1939 |
| 2,345,650 | Attwood | Apr. 4, 1944 |
| 2,438,044 | Freesz | Mar. 16, 1948 |